Feb. 6, 1968   G. W. DINGUS   3,367,090
CYCLONIC APPARATUS
Filed Sept. 6, 1966

United States Patent Office 3,367,090
Patented Feb. 6, 1968

3,367,090
CYCLONIC APPARATUS
George W. Dingus, Pampa, Tex., assignor to Cabot Corporation, Boston, Mass., a corporation of Delaware
Continuation-in-part of application Ser. No. 453,060, May 4, 1965. This application Sept. 6, 1966, Ser. No. 577,500
7 Claims. (Cl. 55—293)

ABSTRACT OF THE DISCLOSURE

The present invention relates broadly to novel self-purging cyclone apparatus. Broadly, said apparatus comprises a cyclone chamber comprising a multi-perforated outer supporting structure and an elastomeric liner attached to the interior thereof. During operations, said liner flexes thereby maintaining the cyclone apparatus free from accretion of solids therein.

---

Figure 2:
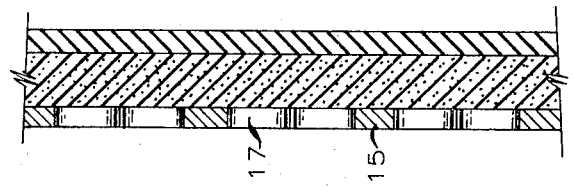

This application is a continuation-in-part of copending U.S. application Ser. No. 453,060, filed May 4, 1965, now abandoned.

The use of cyclonic apparatus for the collection and/or classification of particulate solids from gaseous streams containing solids entrained therein is well known. Said apparatus has been found to be particularly valuable in processes wherein particulate solids such as carbon black, titanium dioxide, silicon dioxide, and the like are produced.

Generally speaking, cyclonic collection apparatus normally functions as follows: a fluid stream containing entrained solids is charged into an enclosed cylindrical or conical zone and caused to spin therein. Said spinning can be caused in any suitable manner although it is usually accomplished by charging the fluid stream into said enclosed cylindrical zone tangentially. The forces imparted to the solid particles by the spinning motion urges said particles outwardly and depending upon the size and/or mass of the particles and the velocity of the fluid, the particles tend to segregate outwardly and downwardly and to eventually fall to the base of the zone. The remaining fluid stream, freed from solid materials, is exited from the enclosed zone while the solid materials at the base of the zone are removed in any suitable manner.

One of the problems often encountered in operation of cyclonic apparatus resides in the tendency of particulate solids to deposit on the internal surfaces thereof. Said problem is generally particularly acute when the fluid stream undergoing treatment in said apparatus is a hot gas and the solid particles entrained therein tend to agglomerate such as, for example, is usually the case during the collection of freshly produced carbon blacks and pyrogenic metal or metalloid oxides. Accretions of particulate solids on the internal surfaces of cyclonic apparatus can eventually partially or wholly plug said apparatus. Moreover, said accretions can alter the flow pattern of the gas stream therein thereby ultimately resulting in partial or complete loss of collecting or classifying efficiency. In accordance with the present invention, however, these problems have largely been eliminated.

Accordingly, it is a principal object of the present invention to provide improved apparatus for the separation and collection of particulate solids from fluid streams.

It is another object of the present invention to provide a novel means for preventing the accretion of particulate solids on the internal surfaces of cyclonic apparatus.

Other objects and advantages of the present invention will in part be obvious and will in part appear hereinafter.

In accordance with the present invention it has been discovered that accretion of particulate solid material on internal surfaces of a cyclonic apparatus is substantially eliminated when said apparatus comprises a chamber comprising (1) a perforated exterior supporting structure, and (2) an elastomeric material interior surface.

Figure 1:
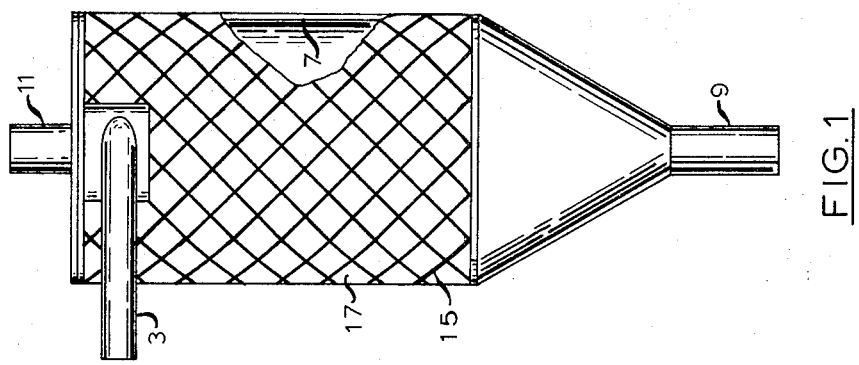

The present invention will be more readily understood when reference is had to the accompanying drawings forming part hereof wherein:

FIGURE 1 is a schematic longitudinal illustration of one embodiment of the present invention in which the chamber portion of cyclonic collection apparatus comprises interior surfaces comprising an elastomeric material supported by an exterior perforated structure; and FIGURE 2 is a cross-sectional schematic view of a portion of a cyclonic collection apparatus chamber wall wherein the elastomeric material inner surface of said chamber comprises two forms of elastomeric material.

In a typical operation of apparatus of the present invention, referring now to FIGURE 1, a fluid stream containing entrained particulate solids is charged tangentially into the cyclone chamber through conduit 3. The entrained solids tend to migrate toward chamber wall inner surfaces 7 and to fall downwardly, and are eventually exited through outlet 9. The fluid stream, freed from at least a portion of said solids courses out of the chamber through conduit 11.

Normally in such an operation, solids contact at least a portion of said surfaces 7 and tend to deposit or accrete thereon. However, in the present novel apparatus, internal surfaces 7, comprising suitable elastomeric material, tend to flex during operations in accordance with fluctuations in pressures within the apparatus. Said fluctuations can be caused intentionally, such as by periodically increasing or augmenting the flow rate of the fluid stream. However, frequent fluctuations in internal pressure are normally inherent in cyclonic separation and/or collection processes and are usually of sufficient amplitude to provide the desired flexure of the elastomeric material through the perforated supporting structure. Thus, the purging is usually effected without requirement for additional process steps or equipment.

For the purposes of the present invention, the term "elastomeric material" generally includes any material which conforms to the criteria set forth by Fred W. Billmeyer in "Textbook of Polymer Chemistry," page 154, 1957, Interscience Incorporated, New York, which criteria are that the material:

(1) Stretch rapidly and considerably under tension with little loss of energy as heat,
(2) Exhibit high tensile strength and high modulus when fully stretched,
(3) Retract rapidly, exhibiting the phenomenon of snap or rebound,
(4) Recover its original dimensions substantially fully on release of stress, exhibiting phenomena of resilience, creep resistance and low permanent set.

Additionally, elastomeric materials suitable for use as the interior surfaces of the cyclonic apparatus chambers of the present invention should be (a) capable of withstanding the temperatures, pressures and stresses incurred during operations and (b) substantially inert with respect to the substances encountered during operations. The choice of said elastomeric material will therefore be dictated to an extent by the particular fluid stream to be treated. Specific examples of elastomeric materials that can frequently be utilized for internal surfaces are: natural gum rubber; 1,3 - cis-butadiene rubber; silicone rubber; butyl rubber; butylene-acrylonitrile rubber; butadiene-styrene rubber; neoprene and the like. Generally preferred, however, when a relatively inert solid/gas stream system is to be treated is natural gum rubber.

The thickness of the elastomeric material utilized in the present invention is subject to considerable variation and is dependent to some extent upon the nature of the support upon which it is mounted. Specifically, the thickness of the elastomeric material should normally range from about 1/32 of an inch to about 5 inches. Preferred, however, is a thickness range of from about 1/16 of an inch to about 1 inch.

It should be noted that foamed elastomers such as flexible polyurethane foam can also comprise the inner walls of the present invention. Said foam can be affixed to the supporting structure by itself or preferably can have a substantially homogeneous elastomeric sheet such as neoprene, natural gum rubber or the like bonded to the innermost surface thereof as illustrated in FIGURE 2.

The general design specifics of the outer supporting structure 15 of the cyclonic apparatus, such as size, material, etc., are generally not critical. However, it can be said that normally structure 15 should be relatively rigid in order that variations of internal pressure during operations can effect flexure of substantially only the elastomeric material forming internal surfaces 7. Obviously, structure 15 must also be capable of withstanding the pressures and stresses incurred during said operations. Specific materials that are generally suitable for the fabrication of the outer supporting structure are stainless steel, cast iron, cast steel, aluminum, ceramic compositions and the like. When the solid/fluid mixture to be separated is relatively cool it will often be satisfactory to utilize thermoplastic materials as materials of construction for the supporting structure, such as various acrylonitrile-butadiene-styrene copolymers, polyamides, polyvinyl chloride, polyacetals, and the like.

As is illustrated in FIGURE 1, it is important that perforations 17 be present in outer supporting structure 15. Said perforations allow internal surfaces 7 to flex substantially more freely than would be the case if surfaces 7 were to be supported by a substantially continuous outer structure. Although the precise area of elastomeric material left unsupported by the perforations in the supporting structure is subject to substantial variation, it is generally desirable that the total area of the perforations comprise an area at least about 30% and preferably above about 50% of the area of the perforated supporting structure.

The elastomeric material comprising the internal surfaces is generally affixed to the outer supporting structure by any suitable method, such as by bonding with an adhesive and/or vulcanizing said elastomeric material directly to the outer structure. The elastomeric material can also be mechanically fastened to the outer structure such as by riveting, wire stapling, etc.; however, a continuous bond, such as is formed when said material is vulcanized, glued and the like to the perforated supporting structure is much preferred.

There follow a number of non-limited examples:

*Example 1*

A product stream from a carbon black forming reactor at a temperature of about 150° F. and containing carbon black at a loading of about 100 grains carbon black/ft.$^3$ gas is charged tangentially into standard cyclone apparatus at a rate of about 400 s.c.f.m. The cyclone utilized has a 3 foot 4 inch cylinder length, 2 foot cone length, is 20 inches in diameter at the juncture cylinder and cone, and comprises a 1/4-inch welded rolled continuous steel structure having no elastomeric material upon the interior surfaces thereof. The internal pressures incurred during operations over a period of about 2 days are measured manometrically and are found to vary between about 6 and 10 inches $H_2O$. After 36 hours, the operation is discontinued and the internal surfaces of the apparatus are examined and are found to have substantial carbon black accretion thereon. Said accretion is removed and collected and is found to weigh about 20 lbs. and to occupy a volume of about 2 cubic feet.

*Example 2*

This example is a duplicate of Example 1 with the exception that to the interior walls of the cyclone there is bonded 3/16 of an inch thick gum rubber sheeting. After a 36-hour run under substantially the same operating conditions as in Example 1, it is found that about 7 lbs. of carbon black have accumulated on the internal surfaces thereof.

*Example 3*

This example is a duplicate of Examples 1 and 2 with the exception that in this example the cyclone apparatus comprises a 3/16 of an inch thick sheet of gum rubber bonded to the interior surface of a supporting perforated steel outer structure as illustrated in FIGURE 1. Said outer structure has diamond shaped perforations approximately 2½ inches in length and 1½ inches in width, the edges of which perforations are spaced about 1/8 of an inch from each other. After continuous operation for about 36 hours, internal surfaces 7 were found to be substantially free of solid accumulation.

It is believed, although there is no intent to be bound by this explanation that accretion of particulate solids on the internal surfaces of cyclonic apparatus normally consists of particles which adhere relatively loosely to one another. Usually, therefore, said accretion is of a friable nature.

Thus, when a fault such as a crack, break or the like is caused to occur in said accretion there is normally a decided tendency for said accretion to crumble to the extent that complete purge thereof occurs. It is further believed that the improved cyclone apparatus of the present invention allows sufficient flexibility of said walls during operations to result in the formation of said faults thereby resulting in substantially continuous purge.

Obviously, many changes can be made in the above illustrative examples and description and in the apparatus illustrated in the accompanying drawings without departing from the scope of the present invention. For instance, only those portions of the interior surfaces which tend to collect accretions thereon need comprise the elastomeric material inner surface supported by the perforated outer structure. It should be noted, when such an embodiment of the present invention is contemplated that the portions of the cyclone apparatus to be treated by perforations and elastomeric lining should also adhere to the minimum perforated area criteria as described hereinbefore. Normally, however, it is generally preferred that substantially the entire cyclone apparatus comprise the chamber walls of the present invention.

Also, the cyclone can be modified in many ways, in order to fit any particular process requirement. Thus, as mentioned hereinbefore, the examples are not limited to the treatment of streams comprising only carbon black and gases but also relate to streams comprising other particulate solids and fluids. Thus, the benefits of the present invention also accrue when solids are separated from fluid streams containing titanium dioxide, silicon dioxide or the like.

Also, fluctuations of internal pressure during operations can be accomplished or augmented by any suitable method. Accordingly, it is intended that the above disclosure be regarded as illustrative and as in no way limiting the scope of the invention.

What is claimed is:

1. In cyclone apparatus of the type comprising a cyclonic chamber, means to introduce a fluid stream containing entrained particulate solids thereinto and means to exit a fluid stream therefrom, the improvement which comprises a wall defining said chamber, said wall comprising an outer supporting structure having a plurality of perforations therethrough and an inner liner comprising an elastomeric material having a thickness of between about 1/32 of an inch and about 5 inches attached to said outer supporting structure, the total area of said perforations comprising at least about 30% of the area of said supporting structure having perforations therein.

2. The apparatus of claim 1 wherein said perforations are diamond-shaped.

3. The apparatus of claim 1 wherein the total area of said perforations comprises at least about 50% of the area of said supporting structure having perforations therein.

4. The apparatus of claim 1 wherein the thickness of the elastomeric material liner is between about 1/16 of an inch and about 1 inch.

5. The apparatus of claim 1 wherein substantially the entire cyclone apparatus chamber comprises said perforated supporting structure and the elastomeric inner liner.

6. The apparatus of claim 1 wherein said elastomeric liner is continuously bonded to the interior of said supporting outer structure.

7. The apparatus of claim 1 wherein said elastomeric liner attached to the interior of said supporting structure comprises
    (1) a layer of an elastomeric material foam adjacent said supporting structure, and
    (2) a layer of substantially unfoamed elastomeric material continuously bonded to the free surface of said foam layer.

References Cited

UNITED STATES PATENTS

| | | | |
|---|---|---|---|
| 1,680,243 | 8/1928 | Becker | 55—435 |
| 2,511,816 | 6/1950 | Shaw | 161—221 X |
| 2,522,135 | 9/1950 | Schaffer | 161—222 X |
| 2,581,920 | 1/1952 | Kuhn | 161—221 X |
| 2,631,953 | 3/1953 | Hubbard et al. | 161—221 |
| 2,816,658 | 12/1957 | Braun et al. | 55—435 X |
| 2,995,255 | 8/1961 | Demeter. | |
| 2,999,563 | 9/1961 | Wehn et al. | 55—435 X |
| 3,034,647 | 5/1962 | Giesse | 55—455 X |
| 3,138,517 | 6/1964 | Charbonneau | 161—190 |
| 3,237,777 | 3/1966 | Brown et al. | 55—435 X |

FOREIGN PATENTS 518,375   3/1953   Belgium.

HARRY B. THORNTON, *Primary Examiner.*

S. W. SOKOLOFF, *Assistant Examiner.*